United States Patent [19]
Long

[11] 3,926,708
[45] Dec. 16, 1975

[54] METHOD OF MANUFACTURING HIGH STRENGTH FIBER REINFORCED THERMO PLASTIC PARTS

[75] Inventor: Roger A. Long, Escondido, Calif.

[73] Assignee: Teledyne Ryan Aeronautical a Division of Teledyne Industries, Inc., San Diego, Calif.

[22] Filed: Oct. 25, 1972

[21] Appl. No.: 300,846

[52] U.S. Cl. ............... 156/242; 156/293; 156/306; 264/92; 264/257
[51] Int. Cl. .......................................... B29b 23/00
[58] Field of Search .......... 156/242, 245, 500, 166, 156/176, 178, 293, 306; 264/90, 92, 257, 258

[56] References Cited
UNITED STATES PATENTS

| | | | |
|---|---|---|---|
| 2,897,841 | 4/1959 | Wai Hui et al. ..................... | 156/178 |
| 2,989,780 | 6/1961 | Zimmerman .......................... | 264/92 |
| 3,116,569 | 1/1964 | Kramer .............................. | 156/245 |
| 3,303,251 | 2/1967 | Heider et al. ....................... | 156/500 |
| 3,349,157 | 10/1967 | Parsons .............................. | 264/258 |
| 3,516,122 | 6/1970 | Schwartz ............................ | 264/92 |
| 3,682,749 | 8/1972 | Schrenk ............................. | 156/500 |
| 3,755,035 | 8/1973 | Olson et al. ........................ | 156/245 |

Primary Examiner—Daniel J. Fritsch
Attorney, Agent, or Firm—Brown & Martin

[57] ABSTRACT

The method includes a shaping step utilizing the good shaping characteristics of thermoplastic material prior to the application of local fiber reinforcement. After shaping high strength fiber reinforcement is applied in the form of tapes. Both adhesive and base material matrix bonding methods of securing the reinforcing tapes are contemplated. For finished parts, that require a smooth surface, it is possible to mold a recess into the surface of the thermoplastic material to accommodate the tape and produce a substantially continuous smooth outer surface.

6 Claims, 3 Drawing Figures

METHOD OF MANUFACTURING HIGH STRENGTH FIBER REINFORCED THERMO PLASTIC PARTS

BACKGROUND OF THE INVENTION

The range of applications for thermoplastic and plastic composite materials have been increasing rapidly in recent years. However the extent to which thermoplastics can be utilized in high load environments has been severely limited. One of the limitations results when reinforcing in the form of fiber reinforcement is incorporated, the plastic looses its formability. Because formability is one of the chief characteristics in plastic that make it economically competitive with more conventional structural materials, the reduction in this formability by the incorporation of fiber reinforcement is normally sufficiently costly to make such high strength applications impractical. High strength applications are particularly difficult where the final part configuration must have complex curvatures requiring relatively severe formability requirements.

In those prior art techniques that incorporate fibers in the plastic material to be formed, it has normally been a requirement that relatively expensive and high initial cost tooling be utilized. Therefore such prior art techniques are suitable only where high unit costs are acceptable or in extremely large production quantities.

Therefore it is desirable to have a method of manufacturing high strength fiber reinforced plastic parts that permit the formation of plastic parts while the plastic base material is in an easily shaped condition, and thereafter reinforcing selectively the plastic formed configuration to produce a high strength composite structure. Such a process is particularly desirable in that it is adaptable to relatively low production runs and maintains a low unit cost with low initial cost tooling.

SUMMARY OF THE INVENTION

According to an exemplary embodiment of the invention, theremoplastic material such as polycarbonates, ABS, acrylates, nylons, and polypropylenes with their good formability characteristics, are mated with long length collimated, parallel oriented fiber, in a method that joins the high strength long length fibers to the base material after shaping is completed. Fibers may be of glass, organics, graphite, boron, or other suitable high strength fibers.

The aforementioned sheet theremoplastics typically soften sufficiently to make them easily formable at temperatures in the range of 200° to 400°F. Thus in the normal practice of the invention, where plastic in sheet form is employed, the materials would be heated to the temperature at which softening takes place, and then secured over a vacuum forming male mold. The vacuum source would then be applied to draw the sheet material onto the mold form. After forming, the configured plastic sheet would be removed from the vacuum forming machine and the fibers in the form of prealigned fiber-matrix tape applied at selected high stress locations. For example, in the forming of components utilized in the manufacture of aircraft, the parts may be formed with a recess to receive reinforced fiber tape along the longitudinal centerline of the aircraft to reinforce against major longitudinal bending stresses. Similarly, reinforced tapes could be applied along the wing skins to increase the stiffness of the wing structure.

It is within the concept of the invention to secure the tape to the base material by utilizing a tape comprised of fibers in a matrix of either the base thermoplastic material or a compatible plastic. In this practice of the invention, the part adjacent to the "tape" area would be heated to a temperature at which the base material in the tape and part would join to form a welded permanent bond. However, adhesive bonding of the tape to the part through the use of an anaerobic adhesive has particular advantages in the process of the invention. Such an anaerobic adhesive, because it does not require a cure temperature to set, is most easily applied and will transfer the necessary shear forces to enable the skin reinforcement effect of the fiber reinforced tape to be fully utilized. Adhesive bonding by the use of heat curing adhesives is also contemplated where curing at some elevated temperature is not detrimental.

Whereas vacuum forming has particular advantages where relatively low cost tooling is desirable, it may also be desirable to utilize an injection molding process wherein the plastic material is provided in bead form, and is melted and injected into a mold so as to expand into either a plastic foamed type material or a solid material. Such foam material when shaped into a mold cavity at an appropriate temperature, forms a foamed center section with solid plastic skin portions, and it is to this skin portion that the reinforcing is applied.

It is therefore an object of this invention to provide a new and improved method of manufacturing high strength fiber reinforced thermoplastic parts.

It is another object of the invention to provide a new and improved method of manufacturing thermoplastic parts that results in a high strength, low cost finished part.

It is another object of this invention to provide a new and improved method of forming thermoplastic parts that permits the plastic part to be formed when it is at its optimum formable condition.

It is another object of this invention to provide a new and improved thermoplastic part that takes optimum advantage of fiber reinforcing.

It is another object of this invention to provide a new and improved method of manufacturing thermoplastic parts that enables long length fibers to be utilized.

It is another object of this invention to provide a new and improved method of manufacturing thermoplastic parts that is susceptible to high volume production.

It is another object of this invention to provide a new and improved method of manufacturing thermoplastic parts wherein skin reinforcing of the plastic material is provided.

Other objects and many advantages of the method of the invention will become more apparent from a reading of the following detailed description, together with the drawings, wherein like reference numerals designate like parts throughout and in which.

Figure 1:
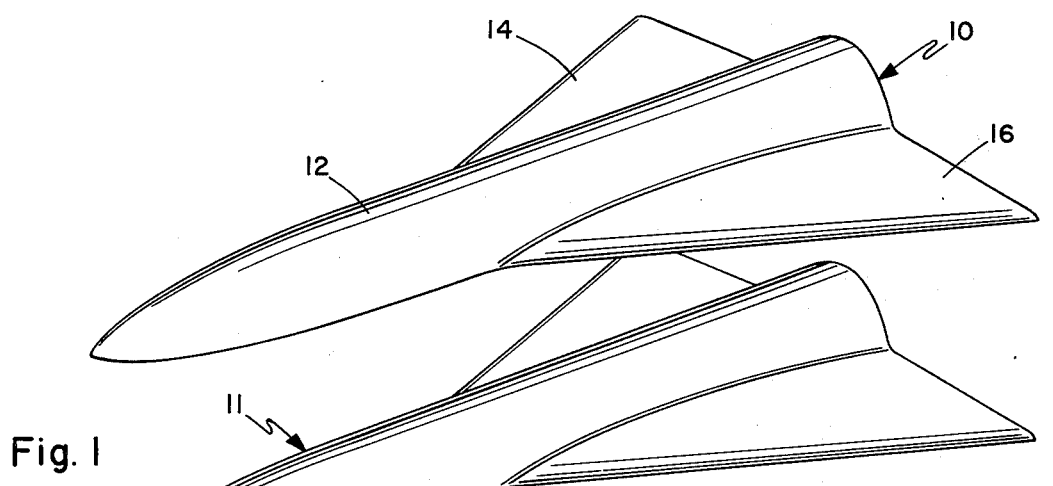
FIG. 1 is a perspective view of a typical molded part separated from its mold.
Figure 2:
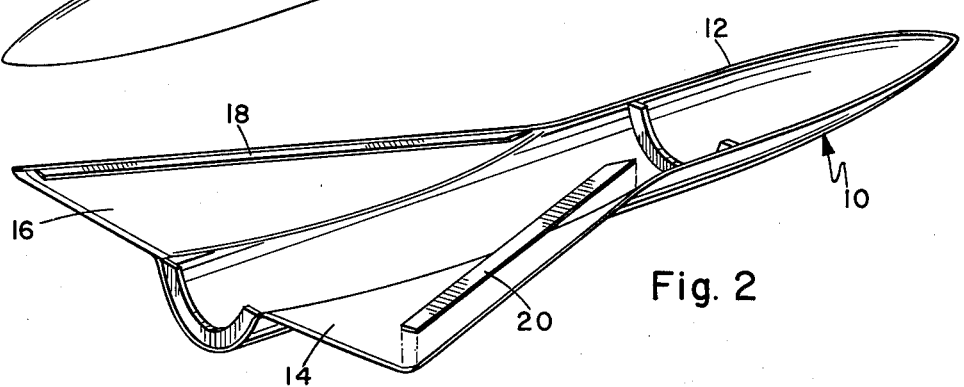
FIG. 2 is a view of the part inverted to illustrate the addition of stiffening and reinforcing tapes.

Referring to the drawings, there is illustrated a part 10 in the form of a section of an aircraft configuration formed over a mold 11 and including a nose and fuselage portion 12 and two generally delta shape wing sections 14 and 16. The method of the invention has particular applicability to the forming of large aircraft parts such as the overall body configuration illustrated. Such parts may be most conveniently formed utilizing vacuum forming techniques and from large sheets of the thermo setting plastic material. However, the plastic material, unaided by reinforcing, is not capable of withstanding the stresses anticipated in normal flight regimes without being of excessive thicknesses and therefore having no low weight and cost benefits. Therefore after the part has been vacuum formed and cooled to harden the configuration, fiber tapes, such as tapes 18 and 20 illustrated in FIG. 2, are applied at the critical stress locations. For the configuration illustrated the tapes are applied to the underside or interior face and along the leading edges of the wing shape. Since these tapes are on the interior of the fuselage form, and therefore need not be faired into the surface of the material for aerodynamic purposes, it is possible to apply the tapes directly to the smooth formed plastic material. Alternatively, as in the situation illustrated in FIG. 3, where the tapes are to be applied to the exterior skin of the material, a recess such as recess 22 may be formed. The mold 26 is formed with a channel 28 so that, as the plastic sheet 30 is pulled down over the mold, the recess 22 will form in the outer surface of the part. After removal from the mold and cooled down, it is possible to apply the external stiffening tape 32 into the recess 22 and thereby produce a faired surface with desirable aerodynamic characteristics.

The tapes utilized in the exemplary embodiment of the invention incorporate a high volume percentage (in excess of 50%) of collimated parallel fibers in excess of 1 inch length. Several layers of the tape may be laid up one upon the other, with each layer having a thickness up to 10 mils.

Figure 3:
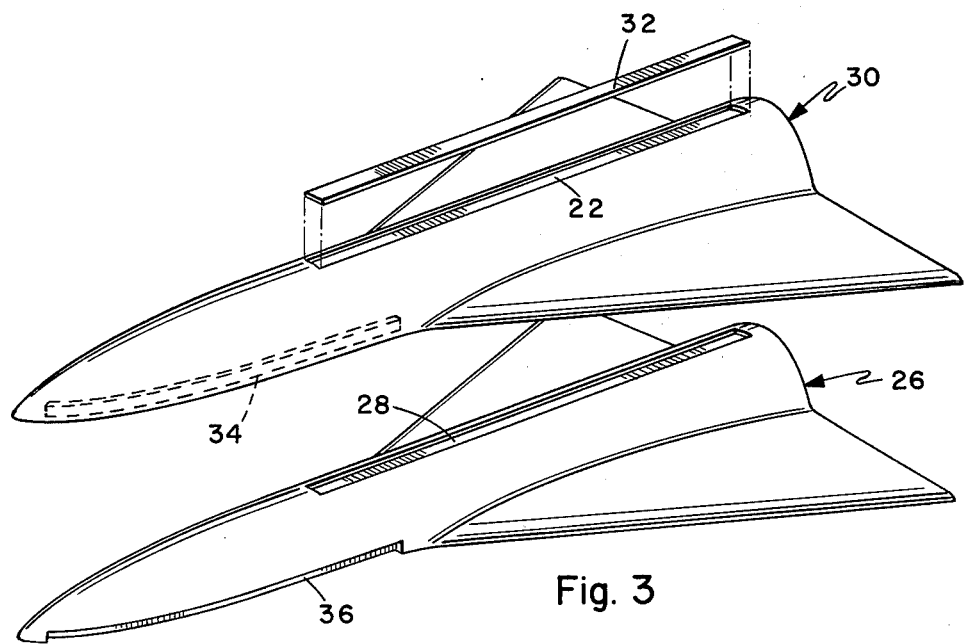
FIG. 3 is a perspective view of an alternative mold and the part formed with tapes received in prepared recesses.

In some instances it may be desirable to mold the part with the stiffener already in place. This capability is also illustrated in FIG. 3 wherein a stiffener 34 is placed on the interior of the sheet material prior to forming and is formed over the male mold and into the groove 36 during the vacuum forming process.

The step of applying the elongated fiber tape to the plastic surface may be accomplished through the use of a tape including a matrix material identical to or structurally and physically compatible with the base material. As a variation to this basic approach, it may be desirable to incorporate a matrix material having characteristics that are midway between those of the fiber and the base material. An example of this application would be where it is desirable to use fibers having a significantly lower thermal coefficient of expansion than that of the plastic base material. In this instance, a matrix material for the fiber tape would be selected to have a thermal coefficient of expansion approximately midway between that of the base material and that of the fibers. With either of the foregoing approaches, it is possible to heat the part to that temperature at which the matrix and base material soften sufficiently to promote a welded permanent and integral bonding.

A second and important bonding approach utilized with the invention is that of adhesive bonding. Various adhesives including epoxy based adhesives and adhesive techniques may be utilized at room temperature or at elevated temperatures to produce a bond having sufficient strength in shear between the fiber reinforced tape and the plastic based material so that sufficient load is transferred to the fibers to take advantage of their high strength — high modulus characteristics.

Of the various adhesives available, the use of anaerobic adhesives is particularly indicated in the practice of the invention. Anaerobic adhesives develop bonding adhesion when pressure between the tape and part is applied and no elevated temperature curing cycles are required and they are particularly adaptable to high volume operation.

Plastic parts shaped and reinforced according to the teachings of the invention are not significantly heavier than those not incorporating reinforcing. While the parts illustrated in the figures show highly selective reinforcement at only those high stress locations where it is a prime prerequisite, the method of the invention suggests itself to use where fiber volume contents between 5 and 50 percent are utilized. These relatively high fiber contents can be obtained, despite the fact that the finished part has a high percentage of compound curves and other difficult to form configurations, which configurations would be impossible to form with plastic composites made from fiber containing sheet material. This is particularly true where long fibers are involved. Long fibers are to be preferred where possible over shorter fibers in that the high strength or high modulus characteristics are best taken advantage of with fibers of this length. However, long length stiff fibers in sheet material make the materials difficult is not impossible to form and thus the invention enables the production of parts which take advantage of having long length, high strength, high modulus fibers and yet have the design contours required.

In a specific application of the invention 6.1 volume percent graphite fibers were used to locally reinforce "AZDEL A-200" plastic. AZDEL A-200 plastic is a glass fiber reinforced thermo plastic sheet based on styreneacrylonitrle copolymer and is made by g.r.t.l. Company of Southfield, Mich. Room temperature tensile strength increased 20%, and the tensile modulus increased 180%. At 150°F test temperature, the tensile strength increased 38% and the tensile modulus increased 200%.

Having described my invention, I now claim.

1. A method of forming high-strength fiber-reinforced thermo plastic parts comprising the steps of,
   heating thermo plastic material to a temperature at which it is readily formable,
   forming said material to the desired final configuration by drawing said material by a vacuum onto a mold,
   permitting said plastic material to cool and harden,
   applying an elongated fiber reinforcing to selective locations on at least one of said surfaces of said material by placing tapes of elongated high strength, and high modulus fibers in a matrix of thermo plastic material onto the surface of the formed thermo plastic part,
   bonding said tapes at said selective locations by heating said thermo plastic matrix material in said tapes.

2. The method of claim 1 wherein
   said step of forming is further characterized by relieving the surface of the plastic material to provide recesses for receiving tapes of elongated fiber-matrix material.

3. A method of forming high strength fiber reinforced thermo plastic parts comprising the steps of,
   heating thermo plastic material to a temperature at which it is readily formable, forming said material to the desired final configuration by drawing said material by a vacuum onto a mold, permitting said plastic material to cool and harden, adhesively bonding tapes of elongated high strength and high modulus fibers in a matrix material onto the surface of the formed thermo plastic part at selected locations.

4. The method as claimed in claim 3 wherein, said step of forming is further characterized by relieving the surface of the plastic material to provide recesses for receiving tapes of elongated fiber matrix material.

5. A method of forming high strength fiber reinforced thermo plastic parts comprising the steps of, heating thermo plastic material to a temperature at which it is readily formable, forming said material to the desired final configuration, permitting said plastic material to cool and harden, placing tapes of elongated high strength and high modulus fibers in a matrix of thermo plastic material onto the surface of said thermo plastic material, bonding said tapes in position on the formed thermo plastic part by heating the matrix material to a temperature at which it bonds to said formed thermo plastic part.

6. The method as claimed in claim 5 wherein, said step of forming is further characterized by relieving the surface of said plastic material to provide recesses for receiving tapes of elongated fiber matrix material.

* * * * *